(12) United States Patent
Wang et al.

(10) Patent No.: US 10,353,778 B2
(45) Date of Patent: Jul. 16, 2019

(54) METHOD FOR PLANNING RECOVERY RESOURCE FOR RESISTING N-TIME FAULTS AND OPTICAL TRANSMISSION DEVICE

(71) Applicant: HUAWEI TECHNOLOGIES CO., LTD., Shenzhen, Guangdong (CN)

(72) Inventors: Yufei Wang, Bridgewater, NJ (US); Chuanjun Wu, Shenzhen (CN); Zhicheng Sui, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 173 days.

(21) Appl. No.: 15/581,150

(22) Filed: Apr. 28, 2017

(65) Prior Publication Data

US 2017/0228287 A1 Aug. 10, 2017

Related U.S. Application Data

(63) Continuation of application No. PCT/CN2014/090096, filed on Oct. 31, 2014.

(51) Int. Cl.
*G06F 11/00* (2006.01)
*G06F 11/14* (2006.01)
(Continued)

(52) U.S. Cl.
CPC ...... *G06F 11/1415* (2013.01); *G06F 11/1658* (2013.01); *H04L 41/00* (2013.01); *H04L 41/0654* (2013.01); *G06F 2201/805* (2013.01)

(58) Field of Classification Search
CPC ................................................. G06F 11/1415
(Continued)

(56) References Cited

U.S. PATENT DOCUMENTS

| 7,398,321 B2 | 7/2008 | Qiao et al. | |
| 2003/0056153 A1* | 3/2003 | Beer | H04L 12/437 |
| | | | 714/43 |

(Continued)

FOREIGN PATENT DOCUMENTS

| CN | 1694418 A | 11/2005 |
| CN | 101188513 A | 5/2008 |

(Continued)

OTHER PUBLICATIONS

International Search Report dated Jul. 6, 2015 in corresponding International Patent Application No. PCT/CN2014/090096.

(Continued)

*Primary Examiner* — Dieu Minh T Le
(74) *Attorney, Agent, or Firm* — Staas & Halsey LLP

(57) ABSTRACT

The present application provides a method for planning a recovery resource for resisting N-time faults and an optical transmission device, and the method includes: planning, on an optical transmission device according to preset network planning information, a recovery resource for resisting (N−1)-time faults for preset (N−1)-time faults, and the recovery resource for resisting (N−1)-time faults is an optimal recovery resource corresponding to each interrupted service during the preset (N−1)-time faults; and planning, by the optical transmission device according to the network planning information and the recovery resource for resisting (N−1)-time faults, a recovery resource for resisting N-time faults for preset N-time faults, where the recovery resource for resisting N-time faults is a network-wide optimal recovery resource corresponding to interrupted services during the N-time faults. According to the present application, recovery resource costs can be reduced, and recovery resource planning reliability can be improved.

18 Claims, 4 Drawing Sheets

(51) Int. Cl.
   *H04L 12/24* (2006.01)
   *G06F 11/16* (2006.01)
(58) Field of Classification Search
   USPC .................................. 714/15, 16, 20, 25, 18
   See application file for complete search history.

(56) References Cited

U.S. PATENT DOCUMENTS

| | | | |
|---|---|---|---|
| 2013/0185432 A1 | | 7/2013 | So et al. |
| 2018/0205320 A1* | | 7/2018 | Galloway ......... H02M 3/33523 |

FOREIGN PATENT DOCUMENTS

| | | | |
|---|---|---|---|
| CN | 101262298 A | 9/2008 | |
| CN | 102223179 A | 10/2011 | |
| CN | 102439920 A | 5/2012 | |
| CN | 103560952 A | 2/2014 | |
| CN | 103959723 A | 7/2014 | |
| EP | 3082306 A1 | 10/2016 | |
| EP | 2750337 B1 | 3/2017 | |

OTHER PUBLICATIONS

Extended European Search Report dated Aug. 3, 2017 in corresponding European Patent Application No. 14904636.9.
Kvalbein A et al.: "Fast Recovery from Link Failures using Resilient Routing Layers," Proceedings IEEE International Symposium on Computers and Communications, Jun. 27, 2005, XP002999122.
Sone Y et al.: "GMPLS-Based Multiple Failure Recovery Employing Restoration Scheme Escalation in Optical Path Networks," IEICE Transcations on Communications, Communications Society, Tokyo, JP, vol. E92B, No. 1, Jan. 1, 2009, pp. 46-58, XP001523520.
International Search Report, dated Jul. 6, 2015, in International Application No. PCT/CN2014/090096 (4 pp.).
Chinese Office Action dated Feb. 2, 2019 from Chinese Patent Application No. 201480077897.6, 4 pages.
Chinese Search Report dated Jan. 11, 2019 from Chinese Patent Application No. 201480077897.6, 3 pages.

* cited by examiner

METHOD FOR PLANNING RECOVERY RESOURCE FOR RESISTING N-TIME FAULTS AND OPTICAL TRANSMISSION DEVICE

CROSS-REFERENCE TO RELATED APPLICATIONS

This application is a continuation of International Application No. PCT/CN2014/090096, filed on Oct. 31, 2014, the disclosure of which is hereby incorporated by reference in its entirety.

TECHNICAL FIELD

The present application relates to communications technologies, and in particular, to a method for planning a recovery resource for resisting N-time faults and an optical transmission device.

BACKGROUND

A transport network is a network in which an information transfer and transmission function is completed between nodes at different locations. A transport network service needs to be protected to avoid a service interruption caused by a network resource fault, so that normal running of the service is ensured. A one-time fault, two-time faults, N-time faults, or the like may occur in the network, and the fault herein may be a link fault or a node fault. Two-time faults are used as an example, and the two-time faults mean that, when a link in the network is faulty and is not recovered, another link is also faulty. Alternatively, when a node in the network is faulty and is not recovered, another node is also faulty. Different services have different fault resistance requirements, for example, a service may be a service that can resist a one-time fault, a service that can resist two-time faults, a service that can resist three-time faults, or the like. The service that can resist N-time faults herein means that, when any consecutive N-time faults occur in the network, for each fault, an appropriate recovery path can be selected according to a current network resource state, to recover the service from an interruption, that is, the service can be reliably recovered from consecutive N fault interruptions.

Generally, when a recovery resource is being planned, in a solution, preset recovery is performed on a network resource in advance, that is, a working path is planned for a service, and a recovery path is also planned for the service, according to different fault resistance requirements of different services. Because recovery is performed only when a service is interrupted, preset recovery resources of different services can be shared if working paths are not interrupted at the same time. In another solution, a network light load technology is used, that is, a recovery resource is planned for an interrupted service during a fault by controlling link utilization.

However, in the preset recovery solution, a recovery path of each service is calculated in advance, and different recovery paths cannot be selected according to different faults; therefore, a large quantity of recovery resources are required, and the solution is costly. In the network light load technology, in order to improve a service recovery success rate, relatively light load is required, and consequently, costs increase; in addition, because the load is set only according to empirical data, reliability of resisting multi-time faults by a service is poor.

SUMMARY

Embodiments of the present invention provide a method for planning a recovery resource for resisting N-time faults and an optical transmission device, to resolve a prior-art problem of high costs and poor reliability in a scenario of resisting multi-time faults.

A first aspect of the present invention provides a method for planning a recovery resource for resisting N-time faults, including:

planning, on an optical transmission device according to preset network planning information, a recovery resource for resisting (N−1)-time faults for preset (N−1)-time faults, where N is an integer greater than or equal to 2, and the recovery resource for resisting (N−1)-time faults is an optimal recovery resource corresponding to each interrupted service during the preset (N−1)-time faults; and planning, by the optical transmission device according to the network planning information and the recovery resource for resisting (N−1)-time faults, a recovery resource for resisting N-time faults for preset N-time faults, where the recovery resource for resisting N-time faults is a network-wide optimal recovery resource corresponding to interrupted services during the N-time faults.

According to the first aspect, in a first possible implementation manner, the planning, on an optical transmission device according to preset network planning information, a recovery resource for resisting (N−1)-time faults for preset (N−1)-time faults includes:

repeatedly performing, by the optical transmission device, the following steps with increasing K until K is equal to N−1, where K increases from 1 by one each time:

traversing K-time faults as preset K-time faults; determining an optimal recovery resource corresponding to each interrupted service during the K-time faults; and planning, according to the network planning information and the optimal recovery resource, a recovery resource for resisting K-time faults for each interrupted service during the K-time faults.

According to the first aspect or the first possible implementation manner, in a second possible implementation manner, the planning, on the optical transmission device according to the network planning information and the recovery resource for resisting (N−1)-time faults, a recovery resource for resisting N-time faults for preset N-time faults includes:

traversing, by the optical transmission device, N-time faults as the preset N-time faults, and determining each interrupted service during the N-time faults;

planning, by the optical transmission device according to the recovery resource for resisting (N−1)-time faults and each interrupted service during the N-time faults, the recovery resource for resisting N-time faults for each interrupted service during the N-time faults;

updating, by the optical transmission device, the recovery resource for resisting N-time faults; and repeatedly performing, by the optical transmission device, the foregoing steps until a preset quantity of repetition times is reached.

A second aspect of the present invention provides an optical transmission device for resisting N-time faults, including:

a first planning module, configured to plan, according to preset network planning information, a recovery resource for resisting (N−1)-time faults for preset (N−1)-time faults, where N is an integer greater than or equal to 2, and the recovery resource for resisting (N−1)-time faults is an optimal recovery resource corresponding to each interrupted service during the preset (N−1)-time faults; and a second planning module, configured to plan, according to the network planning information and the recovery resource for resisting (N−1)-time faults, a recovery resource for resisting N-time faults for preset N-time faults, where the recovery resource for resisting N-time faults is a network-wide optimal recovery resource corresponding to interrupted services during the N-time faults.

According to the second aspect, in a first possible implementation manner, the first planning module is specifically configured to:

repeatedly perform the following steps with increasing K until K is equal to N−1, where K increases from 1 by one each time:

traversing K-time faults as preset K-time faults; determining an optimal recovery resource corresponding to each interrupted service during the K-time faults; and planning, according to the network planning information and the optimal recovery resource, a recovery resource for resisting K-time faults for each interrupted service during the K-time faults.

According to the second aspect or the first possible implementation manner, in a second possible implementation manner, the second planning module is specifically configured to:

traverse N-time faults as the preset N-time faults, and determine each interrupted service during the N-time faults;

plan, according to the recovery resource for resisting (N−1)-time faults and each interrupted service during the N-time faults, the recovery resource for resisting N-time faults for each interrupted service during the N-time faults;

update the recovery resource for resisting N-time faults; and repeatedly perform the foregoing steps until a preset quantity of repetition times is reached.

The embodiments of the present invention provide a method for planning a recovery resource for resisting N-time faults, and the method includes: planning, on an optical transmission device according to preset network planning information, a recovery resource for resisting (N−1)-time faults for preset (N−1)-time faults, where N is an integer greater than or equal to 2, and the recovery resource for resisting (N−1)-time faults is an optimal recovery resource corresponding to each interrupted service during the preset (N−1)-time faults; and planning, by the optical transmission device according to the network planning information and the recovery resource for resisting (N−1)-time faults, a recovery resource for resisting N-time faults for preset N-time faults, where the recovery resource for resisting N-time faults is a network-wide optimal recovery resource corresponding to interrupted services during the N-time faults. In the prior art, a recovery resource is planned based on whether working paths of services are separated; therefore, recovery resources of the services are shared to a relatively small extent, which causes a resource waste. In technical solutions provided in the present invention, a recovery resource is planned based on a fault; therefore, recovery resource costs are reduced, and recovery resource planning reliability is improved.

BRIEF DESCRIPTION OF DRAWINGS

To describe the technical solutions in the embodiments of the present invention more clearly, the following briefly describes the accompanying drawings required for describing the embodiments or the prior art. Apparently, the accompanying drawings in the following description show some embodiments of the present invention, and persons of ordinary skill in the art may still derive other drawings from these accompanying drawings without creative efforts.

DESCRIPTION OF EMBODIMENTS

Figure 1:
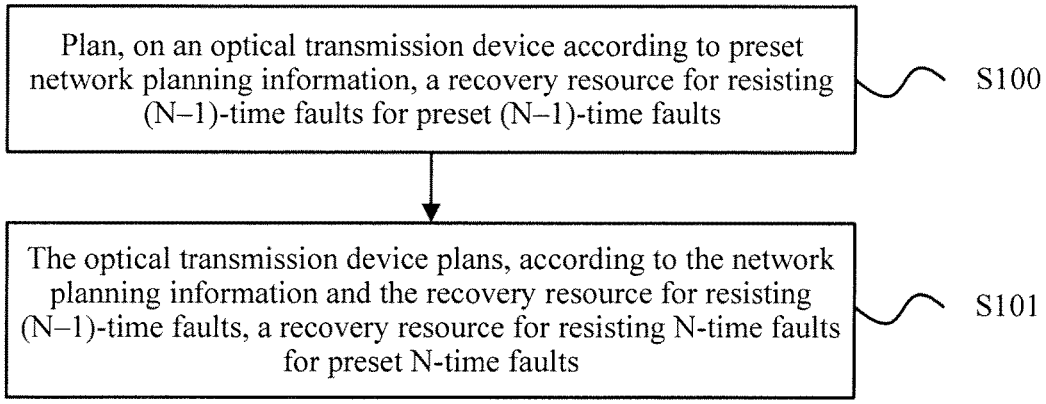
FIG. 1 is a flowchart of a method for planning a recovery resource for resisting N-time faults according to Embodiment 1 of the present invention.

To make the objectives, technical solutions, and advantages of the embodiments of the present invention clearer, the following clearly describes the technical solutions in the embodiments of the present invention with reference to the accompanying drawings in the embodiments of the present invention. FIG. 1 is a flowchart of a method for planning a recovery resource for resisting N-time faults according to Embodiment 1 of the present invention. As shown in FIG. 1, the method includes the following steps:

S100. Plan, on an optical transmission device according to preset network planning information, a recovery resource for resisting (N−1)-time faults for preset (N−1)-time faults.

S101. The optical transmission device plans, according to the network planning information and the recovery resource for resisting (N−1)-time faults, a recovery resource for resisting N-time faults for preset N-time faults.

The foregoing steps may be performed by an optical transmission device. According to the method in this embodiment, the recovery resource for resisting N-time faults may be planned if network resources are sufficient, where N is an integer greater than or equal to 2, that is, a recovery resource for resisting at least two-time faults is planned. It should be noted that, the resisting N-time faults herein means that at least one service in various services supported by a network can resist N-time faults, that is, if any N-time faults occur in the network, for each fault, an appropriate recovery resource can be selected according to a current network resource state, to recover the service from an interruption, that is, the service can be reliably recovered from consecutive N fault interruptions. Certainly, the various services supported by the network may have a same fault resistance requirement, or may have different fault resistance requirements, which is not limited herein.

Specifically, when the recovery resource for resisting N-time faults is being planned, the recovery resource for resisting (N−1)-time faults may be first planned, for the preset (N−1)-time faults, on the optical transmission device according to the preset network planning information. In this planning process, an interrupted service optimal recovery rule is used, that is, when a fault occurs in the network, an optimal recovery resource corresponding to each interrupted service during the fault is configured for the interrupted service. Therefore, the recovery resource, planned according to the rule, for resisting (N−1)-time faults is an optimal recovery resource corresponding to each interrupted service during the preset (N−1)-time faults.

Actually, a recovery resource may be a network device, such as a relay, that can implement service forwarding. A service A supported by the network is used as an example. For example, if the service A is routed from a starting place S to a destination D, because there may be more than one path from S to D, there may be multiple choices when a recovery path is being configured for A. Therefore, it is still ensured that the service can be routed from S to D when the service is interrupted. Different recovery resources correspond to different recovery paths. In the method in this embodiment, when a recovery resource is being planned, the recovery resource for resisting (N−1)-time faults is planned by using the interrupted service optimal recovery rule, that is, a recovery resource planned by using an optimal path in multiple different recovery paths corresponding to each service during an interruption may be used as an optimal recovery resource of the interrupted service, to recover the corresponding interrupted service. The optimal path herein may be, for example, a path on which the service is routed in a shortest time, which is not limited herein. A resource planned in the foregoing manner is an optimal recovery resource corresponding to each service. For example, optionally, one-time faults, two-time faults, . . . , and (N−1)-time faults in the network may be traversed, and a recovery source in the network is planned according to an optimal recovery resource corresponding to each interrupted service during each fault. In this way, when a one-time fault, two-time faults, . . . , or (N−1)-time faults occur in the network, it can be ensured that each interrupted service can be recovered according to an optimal path of the interrupted service.

Optionally, the network planning information herein may be network topology information before a recovery resource is planned, and working path information of each service supported by the network.

Then, after the recovery resource for resisting (N−1)-time faults is planned, the optical transmission device may plan, according to the network planning information and the recovery resource for resisting (N−1)-time faults, the recovery resource for resisting N-time faults for the preset N-time faults. In this planning process, a network-wide optimal recovery rule is used, that is, when a fault occurs in the network, a network-wide optimal recovery resource is configured for each interrupted service during the fault. Therefore, the recovery resource, planned according to the rule, for resisting N-time faults is a network-wide optimal recovery resource corresponding to interrupted services during the N-time faults. For example, the network-wide optimal recovery rule herein may indicate that fewest resources are occupied by a service that can resist N-time faults. A recovery resource is planned according to the rule; therefore, when N-time faults occur, it can be ensured that network-wide optimal recovery of interrupted services can be reliably implemented in a manner of using fewest recovery resources. Certainly, in this case, recovery paths of the interrupted services may not necessarily be optimal, but a total quantity of recovery resources used for the interrupted services is the smallest from a perspective of the entire network.

The following uses resistance to two-time faults as an example to describe the foregoing recovery resource planning process.

First, all one-time faults may be traversed, and each traversed one-time fault herein is the foregoing preset (N−1)-time faults. For example, if there are ten links in the network, each link may be interrupted once, and then, for each fault scenario, if network resources are sufficient, a recovery resource is planned according to an optimal recovery path of an interrupted service during each one-time fault by using a rule of optimally recovering each interrupted service. Then, all two-time faults may be traversed. In an example, there are also ten links in the network. Any two links in the ten links are interrupted once, and then, for each fault scenario, if network resources are sufficient, a recovery resource is planned for interrupted services during two-time faults by using the network-wide optimal recovery rule. For example, if resources can be reduced because a service and another service share a resource, recovery resources in the network may change, so as to ensure that there are fewest recovery resources in the entire network.

When the optical transmission device plans a recovery resource, if planning is performed for multi-time faults together, when any network resource changes, a previous planning result may become invalid. The planning is extremely difficult, and is actually equivalent to a resource increase by means of simulation or emulation, and an algorithm optimization effect is difficult to ensure. If planning is separately performed multiple times according to a quantity of fault resistance times, that is, recovery resources are separately planned, according to the network-wide optimal recovery rule, for resisting a one-time fault and resisting two-time faults, after a recovery resource is planned for resisting two-time faults, if a one-time fault occurs in the network, when a service that can resist a one-time fault is being recovered, the service that can resist a one-time fault may have a better choice because network resources may change when a recovery resource is planned for two-time faults. Therefore, the service that can resist a one-time fault may not be recovered according to a recovery resource planned for resisting a one-time fault, but be recovered according to the selected recovery resource planned for resisting two-time faults, and therefore, it is possible that reliable resistance to two-time faults cannot be implemented. In the method in this embodiment, because a recovery resource for resisting a one-time fault is planned according to an optimal recovery resource of an interrupted service, if network resources are sufficient, after a one-time fault occurs, an interrupted service during each one-time fault is recovered according to an optimal path of the interrupted service. Therefore, even if a network resource may be newly added in a process of planning a recovery resource for resisting two-time faults, a recovery path of the interrupted service during each one-time fault does not change. That is, when recovery paths of affected services in different fault scenarios overlap, resources are shared, and when recovery paths of affected services in different fault scenarios do not overlap, resources are not shared. Therefore, sharing is performed only passively, and although resources can be reduced by means of sharing, a recovery path of a service does not change. After two-time faults occur, because a recovery resource is planned according to the network-wide optimal rule in this case, a recovery path is calculated for an interrupted service according to a current network resource. Certainly, the recovery path of the interrupted path in this case may be inconsistent with an optimal recovery path.

The method, provided in this embodiment, for planning a recovery resource for resisting N-time faults includes: planning, on an optical transmission device according to preset network planning information, a recovery resource for resisting (N−1)-time faults for preset (N−1)-time faults, where N is an integer greater than or equal to 2, and the recovery resource for resisting (N−1)-time faults is an optimal recovery resource corresponding to each interrupted service during the preset (N−1)-time faults; and planning, by the optical transmission device according to the network planning information and the recovery resource for resisting (N−1)-time faults, a recovery resource for resisting N-time faults for preset N-time faults, where the recovery resource for resisting N-time faults is a network-wide optimal recovery resource corresponding to interrupted services during the N-time faults. In the prior art, a recovery resource is planned based on whether working paths of services are separated; therefore, recovery resources of the services are shared to a relatively small extent, which causes a resource waste. In technical solutions provided in the present invention, a recovery resource is planned based on a fault; therefore, recovery resource costs are reduced, and recovery resource planning reliability is improved.

Figure 2:
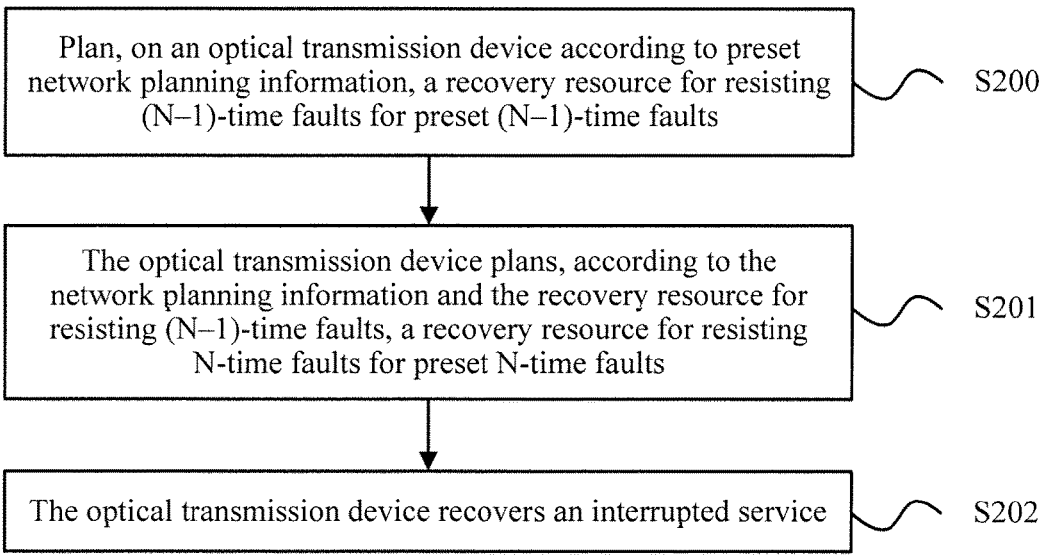
FIG. 2 is a flowchart of a method for planning a recovery resource for resisting N-time faults according to Embodiment 2 of the present invention.

FIG. 2 is a flowchart of a method for planning a recovery resource for resisting N-time faults according to Embodiment 2 of the present invention. Steps in this embodiment are performed by an optical transmission device. As shown in FIG. 2, the method includes the following steps.

S200. Plan, on the optical transmission device according to preset network planning information, a recovery resource for resisting (N−1)-time faults for preset (N−1)-time faults.

Descriptions of this step are the same as those of step S100, and details are not described herein again.

In addition, the foregoing network planning information includes network topology information before a recovery resource is planned, and working path information of services supported by a network.

Specifically, this step may be implemented in the following circulation manner.

The following steps (a) and (b) are repeatedly performed with increasing K until K is equal to N−1, where K increases from 1 by one each time, and K herein is a positive integer.

(a) The optical transmission device traverses K-time faults as preset K-time faults, and determines an optimal recovery resource corresponding to each interrupted service during the K-time faults.

Specifically, it may be learned from the background that, the K-time faults mean that K links in the network become faulty and are not recovered, or K nodes become faulty and are not recovered. A link fault is used as an example in the following for description.

For example, when K is equal to 1, all links in the network are interrupted once, and the optical transmission device records an interrupted service during each fault as an interrupted service, during a one-time fault, corresponding to each fault, and determines an optimal recovery resource corresponding to the interrupted service during the one-time fault, that is, a network resource that can make the interrupted service during the one-time fault be recovered according to an optimal recovery path. A method for specifically determining, according to a network resource, an optimal recovery resource corresponding to an interrupted service is the same as that in the prior art, and details are not described herein.

When K is equal to 2, any two links in all links in the network are interrupted once, and an optimal recovery resource corresponding to interrupted services during two-time faults is obtained according to the foregoing method. When K increases, the method is similar to the foregoing method, and details are not described herein.

K-time faults traversed in this step are the preset K-time faults.

(b) The optical transmission device plans, according to the network planning information and the optimal recovery resource corresponding to each interrupted service during the K-time faults, a recovery resource for resisting K-time faults for each interrupted service during the K-time faults.

Specifically, because the optimal recovery resource corresponding to each interrupted service during the K-time faults is already determined in step (a), the optical transmission device may plan, according to the foregoing network topology information and the working path information of the services supported by the network and according to different fault resistance requirements of different services, the recovery resource for resisting K-time faults, so as to ensure that each interrupted service during the K-time faults can be recovered according to an optimal recovery path of the interrupted service when the K-time faults occur in the network.

S201. The optical transmission device plans, according to the network planning information and the recovery resource for resisting (N−1)-time faults, a recovery resource for resisting N-time faults for preset N-time faults.

Specifically, the following operations may be performed:

(c) The optical transmission device first traverses N-time faults as the preset N-time faults, and determines each interrupted service during the N-time faults. This process is similar to the foregoing step (a), and details are not described herein.

(d) The optical transmission device may plan, according to the recovery resource, planned in step S200, for resisting (N−1)-time faults and each interrupted service during the N-time faults, the recovery resource for resisting N-time faults for each interrupted service during the N-time faults. Specifically, when planning is being performed, a degree of resource sharing between the interrupted services during the N-time faults may be comprehensively considered, and a rule of fewest network-wide resources is used, that is, when a fault occurs in the network, a recovery resource is planned by using a rule of configuring a network-wide optimal recovery resource for each interrupted service during the fault.

(e) The optical transmission device updates the recovery resource for resisting N-time faults.

Specifically, actually, after the recovery resource for resisting N-time faults is planned for each interrupted service during the N-time faults, in order to ensure that there are fewest resources in the entire network, the recovery resource for resisting N-time faults may be updated. For example, a recovery resource, in the recovery resource for resisting N-time faults, whose resource utilization is lower than a preset value is deleted, and then steps (c) and (d) are repeatedly performed. In this way, because recovery resources in the network change, a recovery resource of an interrupted service may also change, and the planned recovery resource for resisting N-time faults also changes. If newly added recovery resources in recovery resources, newly planned during this time, for resisting N-time faults are less than deleted recovery resources in recovery resources, planned during last time, for resisting N-time faults, optimization on the recovery resource for resisting N-time faults is implemented once. The foregoing steps are repeated in this way until a preset quantity of repetition times is reached, so that a network-wide optimal recovery resource is planned.

S202. The optical transmission device recovers an interrupted service.

Planning a recovery resource for a service is to ensure that the service can be reliably recovered when a fault occurs.

Specifically, when a fault occurs in the network, the optical transmission device may first recover an interrupted service according to an optimal recovery resource corresponding to the interrupted service during the fault, and if at least one interrupted service fails to be recovered, the optical transmission device may recover all interrupted services according to all recovery resources in the network, that is, the recovery resource, planned in step S201, for resisting (N−1)-time faults and the recovery resource, planned in step S202, for resisting N-time faults.

For example, if a fault resistance requirement of a service supported by the network is resisting a maximum of five-time faults, in the first four faults, because a recovery resource is planned according to a single service optimal rule, it can be ensured that all interrupted services are reliably recovered. When the fifth fault occurs in the network, that is, another link is faulty when the four-time faults are not recovered, because a recovery resource in this case is planned according to a network-wide optimal recovery rule, if interrupted services are recovered according to the single service optimal rule, a recovery failure caused by resource preemption may occur. Therefore, in this case, an interrupted service may be first recovered according to an optimal recovery resource corresponding to the interrupted service during the fault, and if the recovery fails, all interrupted services may be recovered according to all available recovery resources in the network. The recovery in this case may not necessarily ensure that all services are recovered according to optimal recovery resources, but it can still be ensured that all the services are reliably recovered.

The following uses recovery from two-time faults in a wavelength division network as an example, to describe in detail the foregoing resource planning and service recovery process.

Figure 3A:
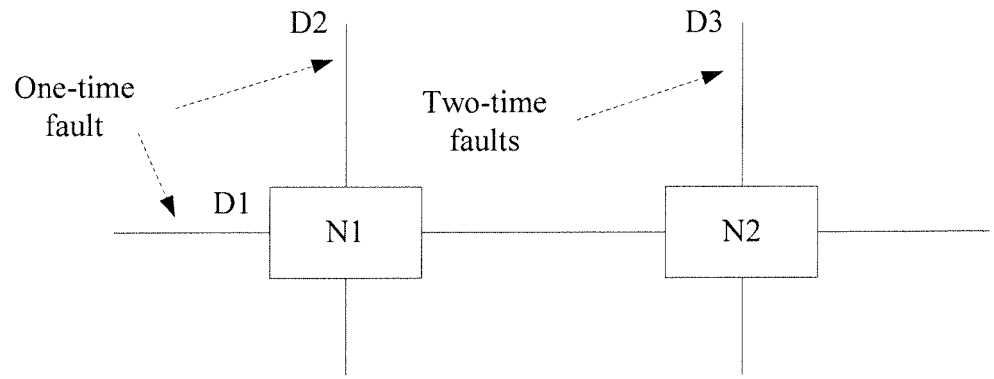
FIG. 3a is a schematic diagram of a network resource before a recovery resource is planned.

As shown in FIG. 3a, only three services D1, D2, and D3 and two nodes N1 and N2 are used as an example herein for description, and the nodes N1 and N2 are nodes on recovery paths of D1, D2, and D3. Both D1 and D2 are services that can resist a one-time fault, and D3 is a service that can resist two-time faults. When D1 is being recovered from a one-time fault, a relay on a recovery path of D1 is required, and a possible location of the relay may be the node N1 or the node N2, that is, D1 can be recovered when the relay is configured at either location of the two nodes. In addition, if both the node N1 and the node N2 have available relay resources, the node N2 is preferably used when D1 is being recovered. It should be noted that different services may share a relay, and the relay may be used to implement conversion from an optical signal to an electrical signal, amplify signal power, and implement a signal correction function, to ensure that a service can be reliably routed to a destination. The relay herein is a recovery resource corresponding to D1, and the relay configured at the node N2 is an optimal recovery resource corresponding to D1. Actually, the foregoing relay may be a relay board built in a node. For D2, during a one-time fault, a relay on a recovery path of D2 is also required, and the relay can be configured only at the node N1. In addition, the one-time fault of D1 is different from the one-time fault of D2; therefore, the two services may share a relay on recovery paths, that is, when the one-time fault of D1 occurs, D1 may be recovered by using the relay, and when the one-time fault of D2 occurs, D2 may also be recovered by using the same relay. For D3, during the first fault, no relay on a recovery path of D3 is required, and the first fault of D3 is the same as the one-time fault of D1. However, during the second fault of D3, a relay on a recovery path of D3 needs to be configured, and the relay can be configured only at the node N2.

Figure 3B:
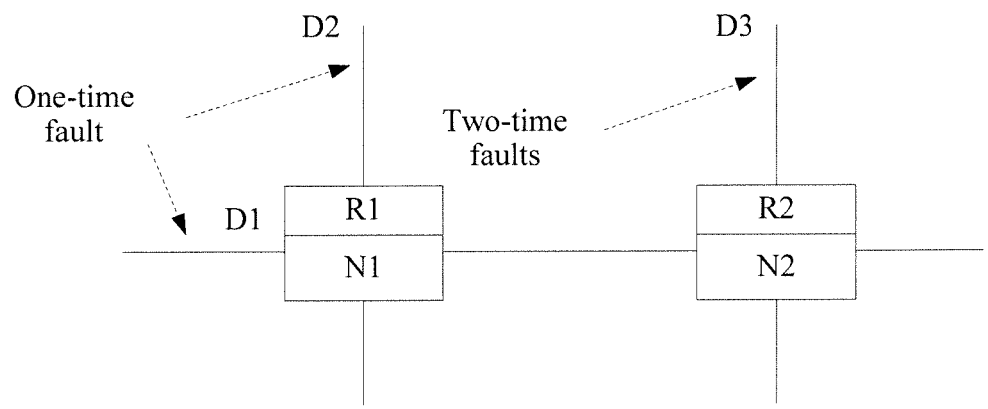
FIG. 3b is a schematic diagram of planning a recovery resource.

If planning is separately performed according to each fault, and planning each time is performed according to a rule of occupying fewest resources in the entire network, in this case, recovery resources planned by the optical transmission device are two relays, as shown in FIG. 3b. Because a relay configured for D1 and D2 may be shared at the node N1, a recovery resource for D1 and D2 is a relay R1 configured at the node N1. During the first fault of D3, no relay is required, and during the second fault, a relay R2 is configured at the node N2. In this case, if a one-time fault of D1 occurs in the network, when D1 is interrupted, and the available relay R2 at the node N2 is discovered when a recovery path of D1 is being calculated for D1, R2 is selected during service recovery of D1 because the relay R2 at the node N2 is preferably selected to recover D1. In this case, D3 whose first fault is the same as the one-time fault of D1 is also recovered from an interruption. If the second fault occurs, D3 is interrupted, and because a recovery resource of D3, that is, the relay R2 at the node N2, is already used by D1, D3 cannot be recovered without the recovery resource. Apparently, this solution cannot ensure service recovery reliability.

Figure 3C:
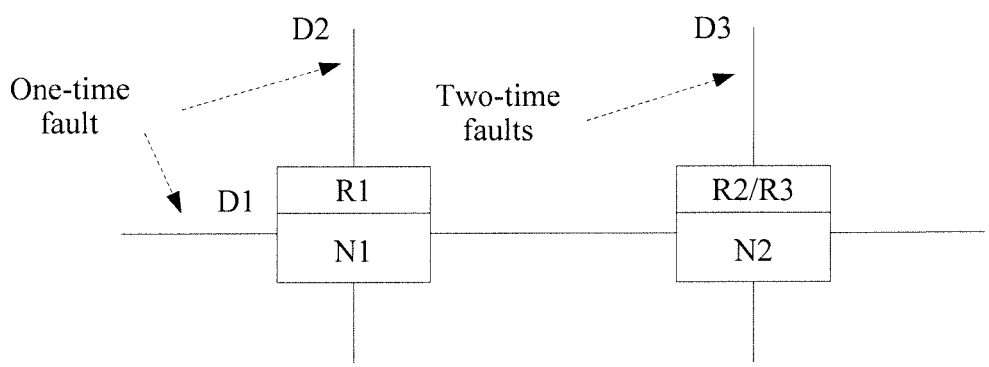
FIG. 3c is a schematic diagram of planning a recovery resource according to Embodiment 2 of the present invention.

In comparison, recovery resources planned by using the method in this embodiment are three relays. As shown in FIG. 3c, when the optical transmission device plans a recovery resource for resisting a one-time fault, D1, D2, and D3 are interrupted services during a one-time fault. As illustrated in step S200, in order to resist a one-time fault, the optical transmission device may configure, according to the single service optimal rule, the relay R2 at the node N2 for recovery of D1, and configure the relay R1 at the node N1 for D2. It should be noted that, in this case, although D1 can share the relay at the node N1 with D2, a relay recovery resource configuration of D1 does not change, that is, the relay required by D1 is not configured at the node N1. When D3 resists a one-time fault, no relay needs to be configured. When a recovery resources is being planned for resisting two-time faults, D3 is an interrupted service during two-time faults. As illustrated in step S201, the optical transmission device may follow the network-wide optimal recovery rule, that is, an objective of reducing network resources, that is, fewest relay resources in this embodiment. Therefore, the optical transmission device may configure a relay R3 at the node N2 for D3. In this case, if a one-time fault of D1 occurs in the network, when D1 is interrupted, D1 may be recovered according to an optimal path, that is, D1 may be recovered by using the relay R2 at the node N2, and in this case, D3 whose first fault is the same as the one-time fault of D1 is also recovered from an interruption. If a one-time fault of D2 occurs in the network, when D2 is interrupted, D2 may also be recovered according to an optimal path, that is, D2 may be recovered by using the relay R1 at the node N1. If the second fault occurs, and D3 is interrupted, D3 may be recovered by using the relay R3 at the node N2. In this way, even if network resources increase because of planning of the recovery resource for resisting two-time faults, a recovery path of a service does not change. Therefore, a problem that services cannot be reliably recovered due to resource preemption between the services does not occur.

A service that can resist N-time faults is further used as an example to describe the foregoing planning process.

Figure 4A:
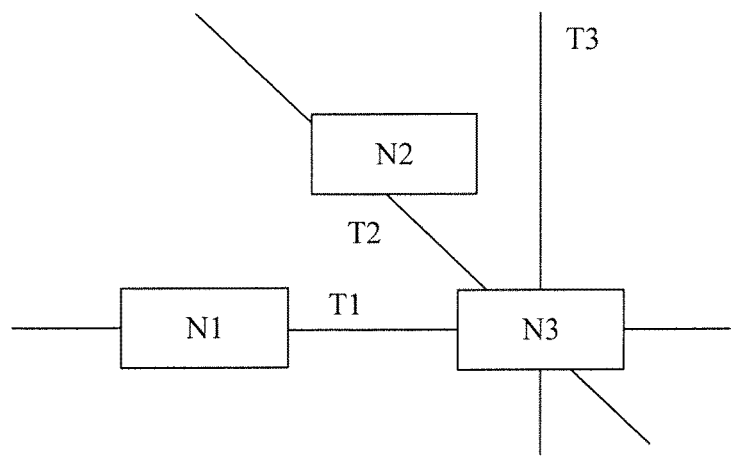
FIG. 4a is another schematic diagram of a network resource before a recovery resource is planned.

As shown in FIG. 4a, it is assumed that T1, T2, and T3 are respectively a service that can resist a one-time fault, a service that can resist two-time faults, and a service that can resist N-time faults. A relay is required when T1 is being recovered from a one-time fault, and the relay may be configured at a node N1 or a node N3. In addition, if both the node N1 and the node N3 have available relay resources, the node N3 is preferably used when T1 is being recovered. T2 does not need a relay when being recovered from the first fault, but needs a relay when being recovered from the second fault, and the relay may be configured at a node N2 or the node N3. In addition, if both the node N2 and the node N3 have available relay resources, the node N3 is preferably used when T2 is being recovered. T3 is a service that can resist N-time faults. It is assumed that T3 does not need a relay when being recovered from the first N−1 faults, but a relay on a recovery path of T3 is required for the $N^{th}$ fault, and the relay can be configured only at the node N3.

Figure 4B:
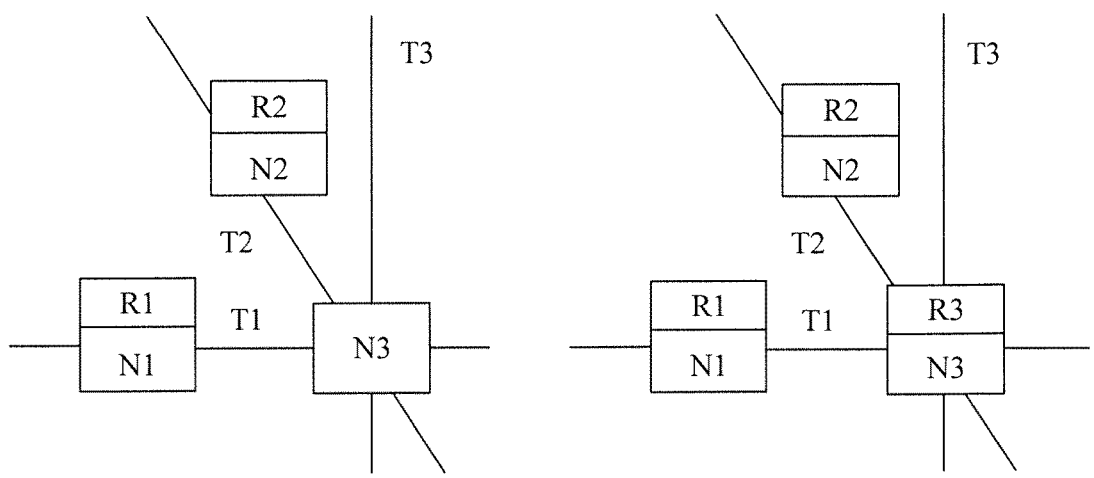
FIG. 4b is another schematic diagram of planning a recovery resource.

If planning is separately performed according to each fault, and planning each time is performed according to a rule of occupying fewest resources in the entire network, recovery resources planned in this case are shown in FIG. 4b. A left diagram in FIG. 4b is a result of planning a recovery resource for resisting (N−1)-time faults, and a right diagram is a result of planning a recovery resource for resisting N-time faults.

Specifically, when planning a recovery resource for resisting a one-time fault, the optical transmission device may configure a relay R1 at the node N1 as a recovery resource of T1, and during a one-time fault, no relay needs to be configured on recovery paths of T2 and T3.

When a recovery resource for resisting two-time faults is being planned, the recovery resource is still configured by using the network-wide optimal recovery rule, and the optical transmission device may configure a relay R2 at the node N2 as a recovery resource of T2. Because T1 supports only resistance to a one-time fault, there is no need to configure a recovery resource. T3 does not need a relay resource when being recovered from the second fault.

When a recovery resource for resisting N-time faults are being planned, the recovery resource is configured according to the network-wide optimal recovery rule, and a relay R3 at the node N3 may be configured as a recovery resource of T3.

After the relay R3 is configured at the node N3, this recovery resource, that is, the relay R3 may also be used as a previously configured recovery resource for resisting (N−1)-time faults. Therefore, if the first fault occurs in the network, when T1 is interrupted and a recovery path of T1 is being calculated for T1, the relay R3 at the node N3 is used. When the second fault occurs in the network, T2 is interrupted, and T2 may also be recovered by using the relay R3 at the node N3. Therefore, when the $N^{th}$ fault occurs in the network, it is likely that T3 cannot be recovered because the resource is preempted for T1 and T2.

Figure 4C:
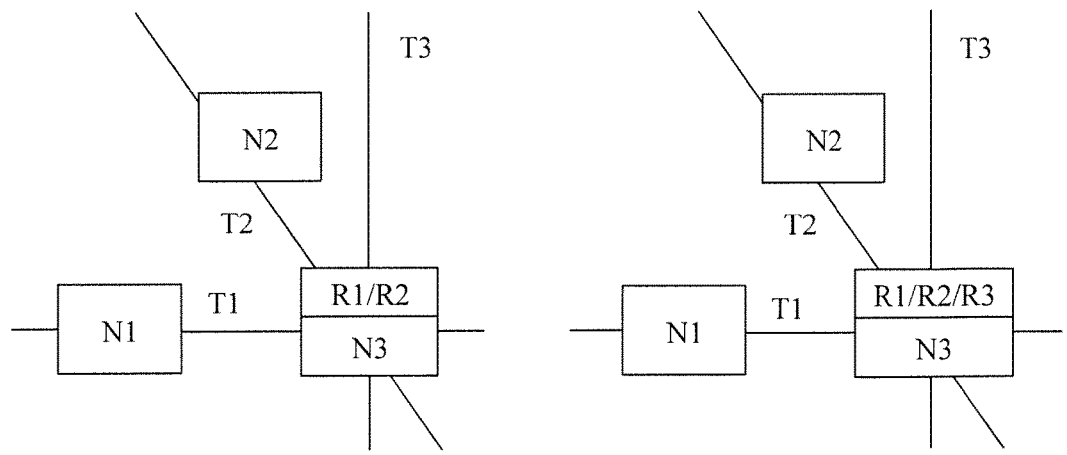
FIG. 4c is another schematic diagram of planning a recovery resource according to Embodiment 2 of the present invention.

In comparison, when a recovery resource is being planned by using the method in this embodiment, because the first N−1 faults occur if resources are sufficient, the optical transmission device configures a recovery resource according to the preset network planning information and an interrupted service optimal recovery rule. Therefore, a resource preemption problem does not occur. Specifically, as shown in FIG. 4c, a left diagram in FIG. 4c is a result of planning a recovery resource for resisting (N−1)-time faults, and a right diagram is a result of planning a recovery resource for resisting N-time faults.

When a recovery resource for resisting a one-time fault is being planned, T1, T2, and T3 are interrupted services during a one-time fault. The optical transmission device may configure a relay R1 at the node N3 as a recovery resource of T1 according to the interrupted service optimal recovery rule, and when T2 and T3 resist a one-time fault, no relay needs to be configured.

When a recovery resource for resisting two-time faults is being planned, T1, T2, and T3 are interrupted services during two-time faults. The optical transmission device may configure a relay R2 at the node N3 as a recovery resource of T2 according to the single service optimal rule. Because T1 supports only resistance to a one-time fault, no recovery resource needs to be planned for T1. When T3 resists a one-time fault, no relay needs to be configured.

When a recovery resource for resisting (N−1)-time faults is being planned, T1, T2, and T3 are all interrupted, that is, T1, T2, and T3 are interrupted services during (N−1)-time faults. T1 and T2 do not support resistance to (N−1)-time faults; therefore, the optical transmission device does not need to plan recovery resources for T1 and T2. T3 does not need a relay resource when being recovered from the $N-1^{th}$ fault.

When a recovery resource for resisting N-time faults is being planned, the optical transmission device may configure a relay R3 at the node N3 as a recovery resource of T3 according to the network-wide optimal recovery rule. No recovery resource needs to be planned for T1 and T2 because T1 and T2 do not support resistance to N-time faults.

In this way, when a fault occurs, although network resources increase when the optical transmission device plans the recovery resource for resisting N-time faults, because the first N−1 services are recovered according to optimal recovery paths, resource preemption caused by an increase of network resources does not occur, and all services in the network can be reliably recovered.

The method, provided in this embodiment, for planning a recovery resource for resisting N-time faults includes: planning, on an optical transmission device according to preset network planning information, a recovery resource for resisting (N−1)-time faults for preset (N−1)-time faults, where N is an integer greater than or equal to 2, and the recovery resource for resisting (N−1)-time faults is an optimal recovery resource corresponding to each interrupted service during the preset (N−1)-time faults; and planning, by the optical transmission device according to the network planning information and the recovery resource for resisting (N−1)-time faults, a recovery resource for resisting N-time faults for preset N-time faults, where the recovery resource for resisting N-time faults is a network-wide optimal recovery resource corresponding to interrupted services during the N-time faults. In the prior art, a recovery resource is planned based on whether working paths of services are separated; therefore, recovery resources of the services are shared to a relatively small extent, which causes a resource waste. In technical solutions provided in the present invention, a recovery resource is planned based on a fault; therefore, recovery resource costs are reduced, and recovery resource planning reliability is improved.

Figure 5:
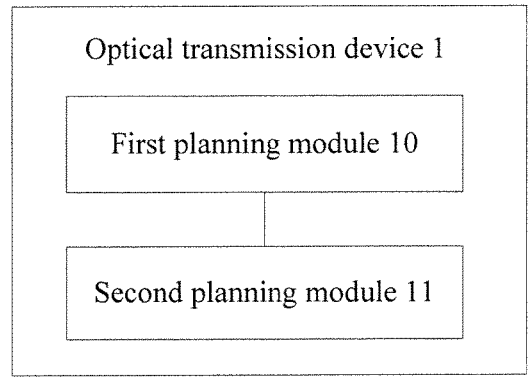
FIG. 5 is a schematic structural diagram of an optical transmission device for resisting N-time faults according to Embodiment 3 of the present invention.

FIG. 5 is a schematic structural diagram of an optical transmission device for resisting N-time faults according to Embodiment 3 of the present invention. As shown in FIG. 5, the optical transmission device 1 for resisting N-time faults includes a first planning module 10 and a second planning module 11.

Specifically, the first planning module 10 is configured to plan, according to preset network planning information, a recovery resource for resisting (N−1)-time faults for preset (N−1)-time faults, where N is an integer greater than or equal to 2, and the recovery resource for resisting (N−1)-time faults is an optimal recovery resource corresponding to each interrupted service during the preset (N−1)-time faults. The second planning module 11 is configured to plan, according to the network planning information and the recovery resource for resisting (N−1)-time faults, a recovery resource for resisting N-time faults for preset N-time faults, where the recovery resource for resisting N-time faults is a network-wide optimal recovery resource corresponding to interrupted services during the N-time faults.

Further, the first planning module 10 is specifically configured to repeatedly perform the following steps with increasing K until K is equal to N−1, where K increases from 1 by one each time: traversing K-time faults as preset K-time faults; determining an optimal recovery resource corresponding to each interrupted service during the K-time faults; and planning, according to the network planning information and the optimal recovery resource corresponding to each interrupted service during the K-time faults, a recovery resource for resisting K-time faults for each interrupted service during the K-time faults.

Still further, the second planning module 11 is specifically configured to: traverse N-time faults as the preset N-time faults, and determine each interrupted service during the N-time faults; plan, according to the recovery resource for resisting (N−1)-time faults and each interrupted service during the N-time faults, the recovery resource for resisting N-time faults for each interrupted service during the N-time faults; update the recovery resource for resisting N-time faults; and repeatedly perform the foregoing steps until a preset quantity of repetition times is reached.

The optical transmission device 1, provided in this embodiment, for resisting N-time faults includes: a first planning module 10, configured to plan, according to preset network planning information, a recovery resource for resisting (N−1)-time faults for preset (N−1)-time faults, where N is an integer greater than or equal to 2, and the recovery resource for resisting (N−1)-time faults is an optimal recovery resource corresponding to each interrupted service during the preset (N−1)-time faults; and a second planning module 11, configured to plan, according to the network planning information and the recovery resource for resisting (N−1)-time faults, a recovery resource for resisting N-time faults for preset N-time faults, where the recovery resource for resisting N-time faults is a network-wide optimal recovery resource corresponding to interrupted services during the N-time faults. According to technical solutions provided in the present invention, recovery resource costs can be reduced, and recovery resource planning reliability can be improved.

Figure 6:
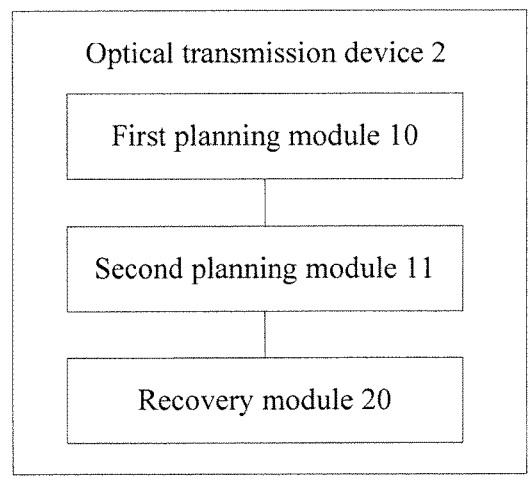
FIG. 6 is a schematic structural diagram of an optical transmission device for resisting N-time faults according to Embodiment 4 of the present invention.

FIG. 6 is a schematic structural diagram of an optical transmission device for resisting N-time faults according to Embodiment 4 of the present invention. As shown in FIG. 6, the optical transmission device 2 for resisting N-time faults includes a first planning module 10, a second planning module 11, and a recovery module 20. The first planning module 10 and the second planning module 11 are same as those in the previous embodiment, and details are not described herein again.

Specifically, the recovery module 20 is configured to: when a fault occurs in a network, recover an interrupted service according to an optimal recovery resource corresponding to the interrupted service during the fault; and if the recovery fails, recover all interrupted services according to all recovery resources in the network.

The optical transmission device 2, provided in this embodiment, for resisting N-time faults includes: a first planning module 10, configured to plan, according to preset network planning information, a recovery resource for resisting (N−1)-time faults for preset (N−1)-time faults, where N is an integer greater than or equal to 2, and the recovery resource for resisting (N−1)-time faults is an optimal recovery resource corresponding to each interrupted service during the preset (N−1)-time faults; and a second planning module 11, configured to plan, according to the network planning information and the recovery resource for resisting (N−1)-time faults, a recovery resource for resisting N-time faults for preset N-time faults, where the recovery resource for resisting N-time faults is a network-wide optimal recovery resource corresponding to interrupted services during the N-time faults. According to technical solutions provided in the present invention, recovery resource costs can be reduced, and recovery resource planning reliability can be improved.

In the several embodiments provided in this application, it should be understood that the disclosed device and method may be implemented in other manners. For example, the described device embodiment is merely exemplary. For example, the unit or module division is merely logical function division and may be other division in actual implementation. For example, a plurality of units or modules may be combined or integrated into another system, or some features may be ignored or not performed. In addition, the displayed or discussed mutual couplings or direct couplings or communication connections may be implemented through some interfaces. The indirect couplings or communication connections between the devices or modules may be implemented in electronic, mechanical, or other forms.

The modules described as separate parts may or may not be physically separate, and parts displayed as modules may or may not be physical modules, may be located in one position, or may be distributed on a plurality of network units. Some or all of the modules may be selected according to actual needs to achieve the objectives of the solutions of the embodiments.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A method for planning a recovery resource for resisting N-time faults, the method comprising:

planning, by an optical transmission device according to preset network planning information for a network having a plurality of nodes and in which a plurality of services are provided, a recovery resource for resisting (N−1)-time faults for preset (N−1)-time faults for respective services among the plurality of services, wherein N is an integer greater than or equal to 2, and the recovery resource for resisting (N−1)-time faults is an optimal recovery resource corresponding to each interrupted service among the plurality of services during the preset (N−1)-time faults;

recovering, by the optical transmission device, each interrupted service by using the planned recovery resource for resisting (N−1)-time faults, which is provided along an optimal path among a plurality of different recovery paths corresponding to the interrupted service, as the optimal recovery resource corresponding to each interrupted service during the preset (N−1)-time faults;

planning, by the optical transmission device according to the preset network planning information and the recovery resource for resisting (N−1)-time faults, a recovery resource for resisting N-time faults for preset N-time faults for respective services among the plurality of services, wherein the recovery resource for resisting N-time faults is a network-wide optimal recovery resource corresponding to interrupted services during the N-time faults; and recovering, by the optical transmission device, each interrupted service by using the planned recovery resource for resisting N-time faults, which is provided along the optimal path among the plurality of different recovery paths corresponding to the interrupted service, as the optimal recovery resource corresponding to each interrupted service during the preset N-time faults.

2. The method according to claim 1, wherein the planning, by the optical transmission device according to the preset network planning information, the recovery resource for resisting (N−1)-time faults for preset (N−1)-time faults comprises:

repeatedly performing, by the optical transmission device, the following operations with increasing K until K is equal to N−1, wherein K increases from 1 by one each time:

traversing K-time faults as preset K-time faults;

determining an optimal recovery resource corresponding to each interrupted service during the K-time faults; and planning, according to the network planning information and the optimal recovery resource corresponding to each interrupted service during the K-time faults, a recovery resource for resisting K-time faults for each interrupted service during the K-time faults.

3. The method according to claim 1, wherein the planning, by the optical transmission device according to the preset network planning information and the recovery resource for resisting (N−1)-time faults, the recovery resource for resisting N-time faults for preset N-time faults comprises:

traversing, by the optical transmission device, N-time faults as the preset N-time faults, and determining each interrupted service during the N-time faults;

planning, by the optical transmission device according to the recovery resource for resisting (N−1)-time faults and each interrupted service during the N-time faults, the recovery resource for resisting N-time faults for each interrupted service during the N-time faults;

updating, by the optical transmission device, the recovery resource for resisting N-time faults; and repeatedly performing, by the optical transmission device, the foregoing operations until a preset quantity of repetition times is reached.

4. The method according to claim 1, after the planning, by the optical transmission device according to the preset network planning information and the recovery resource for resisting (N−1)-time faults, a recovery resource for resisting N-time faults for preset N-time faults, further comprising:

recovering, by the optical transmission device when a fault occurs in the network, an interrupted service according to an optimal recovery resource corresponding to the interrupted service during the fault; and if at least one interrupted service fails to be recovered, recovering all interrupted services according to all recovery resources in the network.

5. The method according to claim 1, wherein the network planning information comprises network topology information and service working path information.

6. An optical transmission device, comprising:

a non-transitory computer readable medium to store executable instructions; and a processor to execute the computer-readable executable instructions, the processor including a first planning module, a second planning module, and a recovery module, wherein the first planning module is configured to plan, according to preset network planning information for a network having a plurality of nodes and in which a plurality of services are provided, a recovery resource for resisting (N−1)-time faults for preset (N−1)-time faults for respective services among the plurality of services, wherein N is an integer greater than or equal to 2, and the recovery resource for resisting (N−1)-time faults is an optimal recovery resource corresponding to each interrupted service among the plurality of services during the preset (N−1)-time faults, the recovery module is configured to recover each interrupted service by using the planned recovery resource for resisting (N−1)-time faults, which is provided along an optimal path among a plurality of different recovery paths corresponding to the interrupted service, as the optimal recovery resource corresponding to each interrupted service during the preset (N−1)-time faults, the second planning module is configured to plan, according to the preset network planning information and the recovery resource for resisting (N−1)-time faults, a recovery resource for resisting N-time faults for preset N-time faults for respective services among the plurality of services, wherein the recovery resource for resisting N-time faults is a network-wide optimal recovery resource corresponding to interrupted services during the N-time faults, and the recovery module is configured to recover each interrupted service by using the planned recovery resource for resisting N-time faults, which is provided along the optimal path among the plurality of different recovery paths corresponding to the interrupted service, as the optimal recovery resource corresponding to each interrupted service during the preset N-time faults.

7. The device according to claim 6, wherein the first planning module is configured to:
repeatedly perform the following operations with increasing K until K is equal to N−1, wherein K increases from 1 by one each time:
traversing K-time faults as preset K-time faults;
determining an optimal recovery resource corresponding to each interrupted service during the K-time faults; and
planning, according to the network planning information and the optimal recovery resource corresponding to each interrupted service during the K-time faults, a recovery resource for resisting K-time faults for each interrupted service during the K-time faults.

8. The device according to claim 6, wherein the second planning module is configured to:
traverse N-time faults as the preset N-time faults, and determine each interrupted service during the N-time faults;
plan, according to the recovery resource for resisting (N−1)-time faults and each interrupted service during the N-time faults, the recovery resource for resisting N-time faults for each interrupted service during the N-time faults;
update the recovery resource for resisting N-time faults; and
repeatedly perform the foregoing operations until a preset quantity of repetition times is reached.

9. The device according to claim 6,
wherein the recovery module is configured to:
when a fault occurs in the network, recover an interrupted service according to an optimal recovery resource corresponding to the interrupted service during the fault; and
if at least one interrupted service fails to be recovered, recover all interrupted services according to all recovery resources in the network.

10. The device according to claim 6, wherein the network planning information comprises network topology information and service working path information.

11. The device according to claim 6, wherein in planning the recovery resource for resisting N-time faults by the second planning module, a number of planned recovery resources for resisting N-time faults at at least one node among the plurality of nodes is greater than a number of planned recovery resources for resisting (N−1)-time faults at the at least one node among the plurality of nodes.

12. An optical transmission device, comprising:
a non-transitory computer readable medium to store executable instructions; and
a processor configured to execute the executable instructions stored in the non-transitory computer readable medium to:
plan, according to preset network planning information for a network having a plurality of nodes and in which a plurality of services are provided, a recovery resource for resisting (N−1)-time faults for preset (N−1)-time faults for respective services among the plurality of services, wherein N is an integer greater than or equal to 2, and the recovery resource for resisting (N−1)-time faults is an optimal recovery resource corresponding to each interrupted service among the plurality of services during the preset (N−1)-time faults,
recover each interrupted service by using the planned recovery resource for resisting (N−1)-time faults, which is provided along an optimal path among a plurality of different recovery paths corresponding to the interrupted service, as the optimal recovery resource corresponding to each interrupted service during the preset (N−1)-time faults,
plan, according to the preset network planning information and the recovery resource for resisting (N−1)-time faults, a recovery resource for resisting N-time faults for preset N-time faults for respective services among the plurality of services, wherein the recovery resource for resisting N-time faults is a network-wide optimal recovery resource corresponding to interrupted services during the N-time faults, and
recover each interrupted service by using the planned recovery resource for resisting N-time faults, which is provided along the optimal path among the plurality of different recovery paths corresponding to the interrupted service, as the optimal recovery resource corresponding to each interrupted service during the preset N-time faults.

13. The device according to claim 12, wherein the processor is further configured to execute the executable instructions stored in the non-transitory computer readable medium to:
repeatedly perform the following operations with increasing K until K is equal to N−1, wherein K increases from 1 by one each time:
traverse K-time faults as preset K-time faults;
determine an optimal recovery resource corresponding to each interrupted service during the K-time faults; and
plan, according to the network planning information and the optimal recovery resource corresponding to each interrupted service during the K-time faults, a recovery resource for resisting K-time faults for each interrupted service during the K-time faults.

14. The device according to claim 12, wherein the processor is further configured to execute the executable instructions stored in the non-transitory computer readable medium to:
traverse N-time faults as the preset N-time faults, and determine each interrupted service during the N-time faults;
plan according to the recovery resource for resisting (N−1)-time faults and each interrupted service during the N-time faults, the recovery resource for resisting N-time faults for each interrupted service during the N-time faults;
update the recovery resource for resisting N-time faults; and
repeatedly perform the foregoing operations until a preset quantity of repetition times is reached.

15. The device according to claim 12, wherein the processor is further configured to execute the executable instructions stored in the non-transitory computer readable medium to:
recover, when a fault occurs in the network, an interrupted service according to an optimal recovery resource corresponding to the interrupted service during the fault; and
if at least one interrupted service fails to be recovered, recover all interrupted services according to all recovery resources in the network.

16. The device according to claim 12, wherein the network planning information comprises network topology information and service working path information.

17. The method according to claim 1, wherein in planning the recovery resource for resisting N-time faults, a number of planned recovery resources for resisting N-time faults at at least one node among the plurality of nodes is greater than a number of planned recovery resources for resisting (N−1)-time faults at the at least one node among the plurality of nodes.

18. The device according to claim 12, wherein in planning the recovery resource for resisting N-time faults, a number of planned recovery resources for resisting N-time faults at at least one node among the plurality of nodes is greater than a number of planned recovery resources for resisting (N−1)-time faults at the at least one node among the plurality of nodes.

* * * * *